Dec. 28, 1926.
H. POWERS
LAWN MOWER SHARPENER
Filed June 6, 1924
1,612,219
2 Sheets-Sheet 2
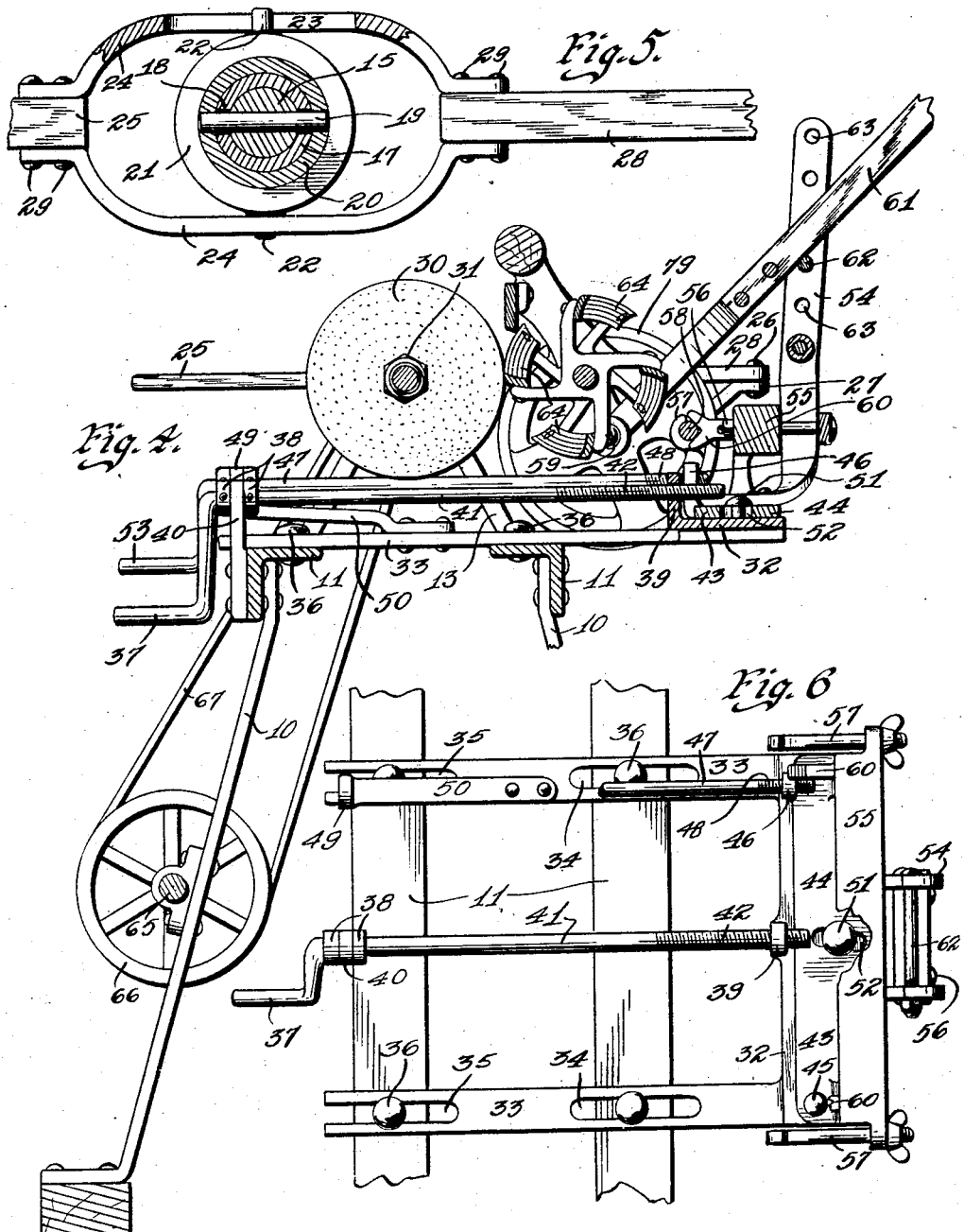
Witness
R. M. Rusher
Inventor
Harry Powers
by Bair & Freeman Attorneys Patented Dec. 28, 1926.

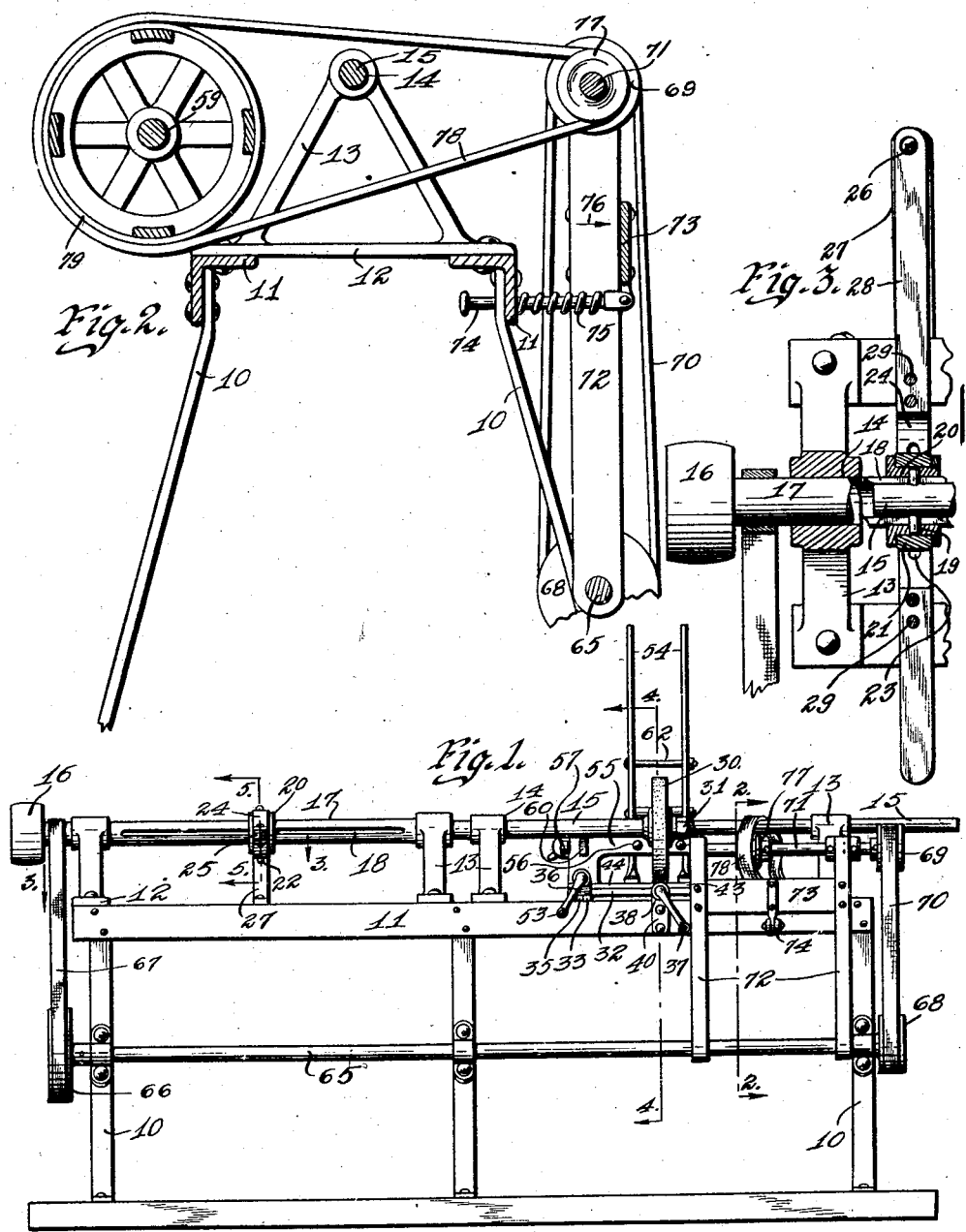

UNITED STATES PATENT OFFICE.

HARRY POWERS, OF HUMBOLDT, IOWA.

LAWN-MOWER SHARPENER.

Application filed June 6, 1924. Serial No. 718,279.

The object of my invention is to provide a lawn mower sharpener of simple, durable and comparatively inexpensive construction, wherein it can be manufactured and marketed at a low cost.

Still a further object is to provide a lawn mower sharpener, wherein the cutter blades of the lawn mower may be sharpened upon an emery wheel, which may be manually operated over the cutting blades of the lawn mower.

Still a further object is to mount the lawn mower without disconnecting any of the parts thereof upon the machine, and connect it to a revolving shaft so that the blades thereof revolve during the sharpening operation.

Still a further object is to provide an emery wheel for sharpening of the lawn mower blades, which emery wheel reciprocates from one end of the lawn mower to the other end of the lawn mower for sharpening all of the lawn mower blades.

Still a further object is to provide a sliding support for the lawn mower wherein the lawn mower may be properly positioned upon the machine for sharpening.

Still a further object is to provide a swinging adjustment plate for properly lining up of the lawn mower when being sharpened.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a front elevation of my improved lawn mower sharpener.

Figure 2 is an enlarged sectional view taken on line 2—2 of Figure 1 with the lawn mower wheel shown in section, and operatively connected by a belt to a drive shaft of the machine.

Figure 3 is a detail, sectional view taken on line 3—3 of Figure 1 showing the control lever for imparting a reciprocating movement to the emery wheel.

Figure 4 is a detail, sectional view taken on line 4—4 of Figure 1 showing the lawn mower partly in section.

Figure 5 is a detail, sectional view taken on line 5—5 of Figure 1 showing the control lever for the emery wheel; and Figure 6 is a top, plan view of the sliding base upon which the lawn mower is supported.

In the accompanying drawings I have used the reference numeral 10 to indicate generally a number of supporting legs, which are connected together by angle irons 11 at their upper ends wherein there is formed a complete supporting frame.

The two angle irons 11 are connected together by cross members 12, which have upwardly extending arms 13 terminating into central bearings 14 for supporting the shaft 15. The shaft 15 is driven from a pulley wheel 16 connected to a hollow sleeve 17 in which is slidably mounted the shaft 15.

The sleeve 17 is provided with a slot 18 through which a pin 19 extends, that is fastened to the shaft 15.

From the construction of the parts just described, it will be seen that the shaft 15 is capable of sliding or reciprocating movement relative to the sleeve 17 and rotates therewith.

In order to reciprocate the shaft 15, I mount a grooved collar 20 upon the sleeve 17. The pin 19 extends into the grooved collar 20 for retaining it in position on the sleeve 17.

An annular ring 21 is received within the grooved collar 20 and has a pair of trunnions 22 thereon, which are extended through a pair of slots 23 formed in the outspread arms 24.

The outspread arms 24 are connected at one end to a lever 25 which is in turn pivotally connected by means of a pivot 26 to a support 27. The support 27 is mounted upon the frame of the machine and particularly upon one of the angle iron bars 11.

The other ends of the members 24 are connected to a control bar 28.

From the construction of the parts just described it will be seen that swinging movement of the control bar 25 will impart a reciprocating movement to the shaft 15.

The slots 23 permit the swinging movement of the control lever 28.

The outspread arms or members 24 are connected to the lever 25 and the control lever 28, by means of the bolts or rivets 29.

Mounted upon the shaft 15 is an emery wheel 30 held in position by a pair of clamping nuts 31 connected to the shaft 15.

Mounted upon the frame of the machine, and particularly upon the angle iron bars 11 is a sliding base 32, which consists of a cross member connected to a pair of arms 33. The arms 33 are provided with slots 34 and notches 35, through which are extended rivets 36.

The rivets 36 are connected to the angle irons 11 and for the connection between the sliding base 32, and the machine frame proper.

In order to move the sliding base 32 relative to the frame of the machine, I provide a crank arm 37 extending through a lug 38 on the frame of the machine and connected by means of a screw thread connection to a lug 39 on the sliding base 32.

A number of collars 40 may be positioned between the crank arm 37 and the lug 38.

The crank arm 37 includes a long rod 41, which is screw threaded on one of its ends, as at 42, for forming the screw thread connection with the lug 39.

From the construction of the parts just described, it will be seen that rotation of the crank arm 37 will impart a reciprocating or sliding movement to the base 32.

A swinging base 43 is mounted upon the sliding base 32 and includes a swinging member 44 pivotally connected to the base 32 by the pivot 45.

On the opposite end of the swinging member 44 is a lug 46 having an internally screw threaded opening into which is extended a rod 47 having screw threads 48 thereon.

The rod 47 extends through a lug 49 mounted upon a supporting arm 50. The supporting arm 50 is in turn mounted upon the arm 33 of the sliding base 32.

From the construction of the parts just described, it will be seen that I am able to impart a swinging movement to the member 44.

The member 44 is also connected to the sliding base 32 by means of a bolt 51 extending through a slot 52 formed in the member 44, as clearly shown in Figure 6 of the drawings.

The rod 47 has a crank arm or hand engaging portion 53 formed on one of its ends whereby it can be engaged for operating the rod 47.

In order to mount and support a lawn mower in sharpening position upon the machine, I provide a pair of upwardly extending spaced arms 54, which are mounted upon the member 44 of the swinging base 43.

The arms 54 have connected to them a cross bar 55 by means of the bolts 56. The ends of the cross bar 55 have hook bolts 57 mounted therein which are designed to engage the protector bar 58 of a lawn mower 59.

A pair of saddles 60 are mounted upon the bar 55 and engage one side of the protector bar 58.

From the construction of the parts just described, it will be seen that the hook bolts 57 and the saddles 60, when properly positioned will securely engage the protector bar of the lawn mower.

The handle 61 of the lawn mower extends between the spaced arms 54, and may rest upon a bolt 62 which can be selectively mounted in any of the openings 63 of the arms 54.

The cutting blades 64 of the lawn mower 59 are designed to engage the emery wheel 30, as clearly shown in Figure 1 of the drawings.

After the lawn mower 59 is mounted in its support, then the entire sliding base 32 is moved towards the emery wheel until the cutting blades 64 are in proper position relative thereto for sharpening.

The crank arm 53 of the rod 47 is then engaged for swinging the lawn mower and its supporting frame, which is the cross bar 55 as well as the arm 44.

The rod 47, when operated, will impart a fine adjustment to the positioning of the lawn mower and will insure proper alinement so that the emery wheel may engage each of the blades 64 throughout their entire length so that reciprocating as well as rotary movement is imparted to the wheel 30.

In this connection, it may be mentioned that the lawn mower blades 64 are rotated as well as the emery wheel, and in order to properly connect the lawn mower to a drive shaft or the machine itself, I provide the following described mechanism.

Mounted upon the supporting legs 10 is a longitudinal shaft 65, which has a pulley wheel 66 on one of its ends connected to the sleeve 17 by means of the belt 67.

From the construction of the parts just described, it will be seen that rotation is imparted to the shaft 65 from the sleeve 17.

On the opposite end of the shaft 65 from the pulley wheel 66 is a pulley wheel 68 connected to a pulley wheel 69 by the belt 70. The pulley wheel 69 is mounted upon a short longitudinal shaft 71 mounted in a swinging frame 72.

The frame 72 includes a pair of arms pivotally mounted upon the shaft 65 and are connected together by a cross brace 73. The cross brace 73 in turn has connected to it a link 74.

The link 74 extends through one of the angle irons 11 and has a compression coil spring 75 mounted thereon, which normally tends to force the entire swinging frame 72 in the direction indicated by the arrow 76.

The shaft 71 has a pulley wheel 77 mounted thereon between the arms 72, whereby a belt 78 may extend therearound, which also extends around the drive wheel 79 of the lawn mower 59.

It will be noted that the compression spring 75 will cause the belt 78 to remain taut due to the fact that the frame 72 tends to move in the direction indicated by the arrow 76.

From the construction of the parts just described, it will be noted that the swinging frame 72 provides a means whereby many different sizes of lawn mower wheels may be operatively connected by the belt 78, the differences being compensated by the swinging frame 72.

Practical operations.

In the practical operation of my lawn mower sharpener, the lawn mower is placed upon the support with the protector bar 56 received in the saddle portions 60 and thereafter the hook bolt 57 is tightened for securely retaining the lawn mower in position.

The belt 78 is then passed around one of the lawn mower wheels 79 and the swinging frame 72, due to the spring 75, will cause the belt to be tight. The crank arm 37 may then be operated for sliding the entire sliding base 32 towards the emery wheel 30, wherein the blades 64 of the lawn mower 59 will be positioned against the emery wheel.

In case the lawn mower blades are not exactly true and properly alined, then the crank handle 53 may be rotated for imparting a sliding swinging movement to the lawn mower, wherein fine adjustment of it can be accomplished. Power is then applied to the shaft 15 and it is manually reciprocated by swinging movement of the control bar 28.

The emery wheel 30 is reciprocated back and forth across the blades of the lawn mower, and at the same time, the lawn mower blades are revolved.

The ordinary sharpener bar of the lawn mower is loosened during the sharpening operation so as not to interfere with the easy rotation of the blades 64.

The spaced arms 54 retain the handle 61 of the lawn mower in such position as will permit the lawn mower blades to be properly positioned for sharpening.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. In a lawn mower sharpener, a frame, a lawn mower support and bearings mounted thereon, a sleeve rotatably mounted in said bearings, a shaft slidably mounted in said sleeve and adapted to rotate therewith, a lever for imparting sliding movement to said shaft, and emery wheel on said shaft adjacent the lawn mower support adapted to engage the blades of a lawn mower positioned on said support, and means for imparting rotation to the lawn mower blades of a lawn mower mounted upon said support, said means comprising a shaft operatively connected to said sleeve and mounted on a pivoted frame and operative connection between said shaft and a drive wheel of said mower.

2. A machine of the class described comprising a lawn mower support swingably mounted on a sliding frame, a shaft, an emery wheel rotatably mounted on said shaft and capable of being moved longitudinally relative to the axis of the reel of a lawn mower secured on said support, a lever for causing such movement and means for operatively connecting said shaft to a drive wheel of said lawn mower, said means comprising a pivotally mounted frame supporting a pulley, an operative connection between the shaft and said pulley and a belt connecting said pulley to said drive wheel.

3. In combination with a sharpening machine having a lawn mower support, an emery wheel and means for moving said emery wheel longitudinally of its axis, means for rotating a drive wheel of the lawn mower, said means comprising a shaft operatively driven from the driving machanism for said emery wheel, a frame pivoted on said shaft, a second shaft journaled on the outer end of said frame and operatively connected to said first shaft, a pulley on said second shaft, a belt connecting said pulley to a drive wheel of said mower and resilient means for resiliently urging said frame in one direction whereby said belt is maintained taut.

4. In a machine of the class described a base, bearings mounted thereon, a lawn mower support swingingly mounted on a sliding frame on said base, a sleeve rotatably mounted in said bearings, a shaft slidably mounted in said sleeve and adapted to rotate therewith, a lever for imparting sliding movement to said shaft, an emery wheel on said shaft adapted to coact with the blades of a lawn mower clamped to said mower support, means for rotating the blades of said mower, comprising a pivoted frame, a shaft journalled thereon, operative connections between said shaft and said sleeve, a pulley on said shaft designed to drive a drive wheel of said mower by means of a belt, and means for applying tension to said pivoted frame for keeping said belt taut.

HARRY POWERS,